Figure 1:
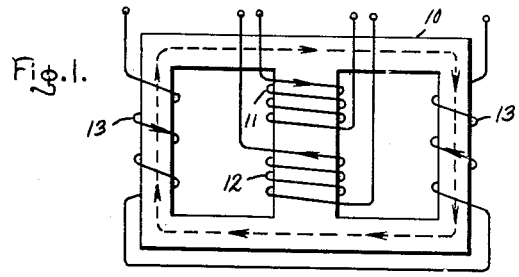

Sept. 9, 1924.

A. S. FITZ GERALD 1,508,174

CONTROL OF ELECTRIC SWITCHES

Filed Aug. 28, 1923

2 Sheets-Sheet 1

Inventor:
Alan S. FitzGerald
by
His Attorney.

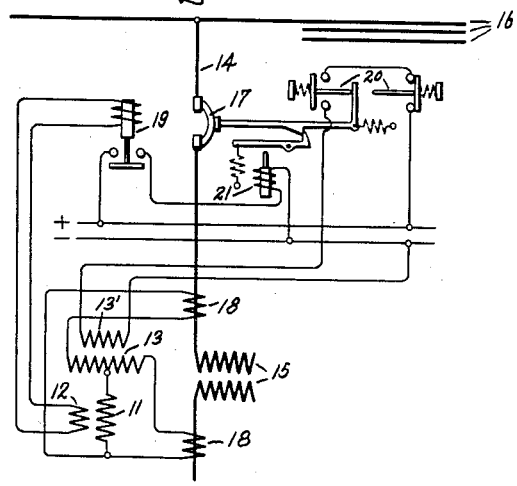
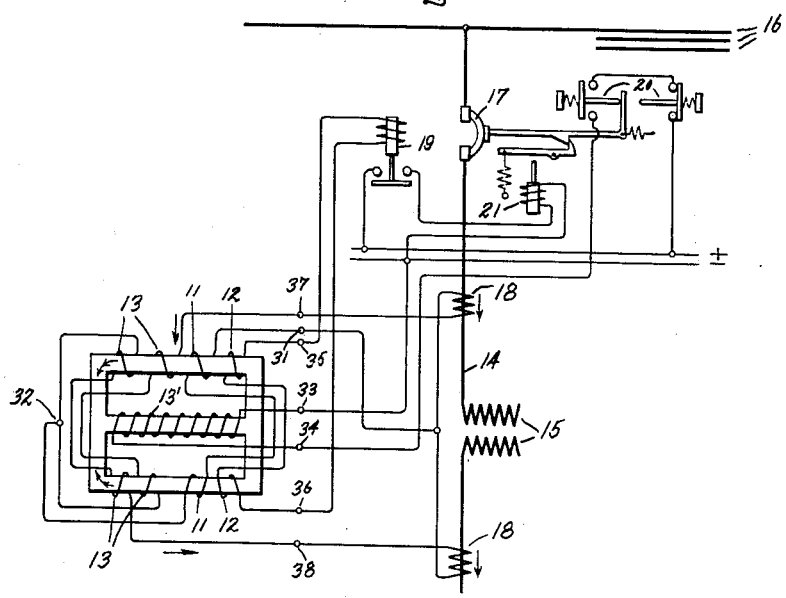

Patented Sept. 9, 1924.

1,508,174

UNITED STATES PATENT OFFICE.

ALAN STEWART FITZ GERALD, OF FINCHLEY, ENGLAND, ASSIGNOR TO GENERAL ELECTRIC COMPANY, A CORPORATION OF NEW YORK.

CONTROL OF ELECTRIC SWITCHES.

Application filed August 28, 1923. Serial No. 659,765.

*To all whom it may concern:*

Be it known that I, ALAN STEWART FITZ GERALD, a subject of the King of Great Britain, residing at Finchley, in the county of Middlesex, England, have invented certain new and useful Improvements in the Control of Electric Switches, of which the following is a specification.

My invention relates to the circuits and apparatus in connection with the operation of electric switches, circuit breakers and the like.

An object of my invention is to avoid trouble which occasionally occurs due to transient currents at the moment of switching. A further object is to provide means for overcoming this trouble without employing relays or other additional apparatus having moving parts.

On closing a switch on a live circuit, certain phenomena are known to occur whereby abnormal currents of short duration are produced, as, for instance, those associated with the charging current flowing into a circuit having appreciable electrostatic capacity, or the switching on of transformers or other apparatus having highly magnetic circuits, when heavy magnetizing currents of short duration occur. These currents depend to a large extent upon the instantaneous value of the voltage at the moment of switching in, and cannot, therefore, be easily balanced by ordinary protective measures. In circuits having capacity and inductance the transient currents may be magnified by resonance. Such transient currents, although in the majority of cases not a source of danger to apparatus or plant, frequently give rise to inconvenience due to the tripping of overload or other forms of protective gear. It is found, for instance, that where a circuit containing a transformer is protected by a discriminating differential system of protection, the protective apparatus is liable to be actuated by the magnetizing current at the moment of switching the circuit into service. Although these difficulties occur principally on closing a circuit, similar trouble is not unknown on opening a circuit.

The present invention broadly consists in impressing an auxiliary electromotive force upon the apparatus or means arranged to protect the circuit in such a way as to restrain or render less sensitive the operation of the protective means during the switching in or out of the circuit, or at any other time when it is desired that the protective apparatus should be less sensitive than usual. By the word restrain, I mean that a bias is introduced into the protective means which will tend to prevent the operation of the protective means while the said bias is operative.

The protective means may include a relay or other electroresponsive device such, for example, as the biasing transformer illustrated in my copending applications, Serial No. 587,194, filed September 9, 1922 for protective devices for electric distribution systems and Serial No. 652,276, filed July 18th, 1923 for alternating electric current protective apparatus, and assigned to the same assignee as this invention, and the auxiliary electromotive force may be impressed upon one of the windings thereof, having any other electromotive force impressed thereon, or upon an auxiliary winding arranged thereon. The magnetic circuit of this auxiliary winding should be of good permeability. Preferably, I use an auxiliary winding which can be energized temporarily, during the switching in of the circuit, from the source of electromotive force used for operating the main switch of the circuit. Means may be operatively associated with the main switch for controlling the auxiliary electromotive force, or alternatively, in cases where the main switch is operated by a remote control circuit, an additional contact may be provided upon the switch of the control circuit for controlling the auxiliary electromotive force in order that this latter may be impressed when the control circuit is operated or closed. In some cases, for example when experiments are being conducted on the distribution system, it may be desired remotely to control the sensitivity of all the protective apparatus. This can be done by applying the electromotive force through a switch and adjustable resistance when required.

Figure 2:
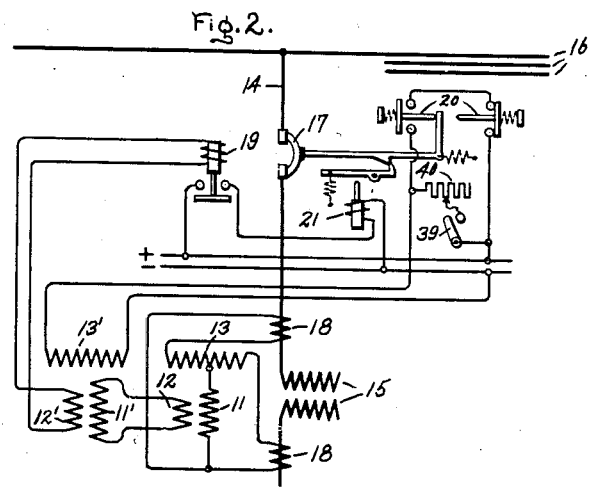

Fig. 1 illustrates one form of the biasing transformer disclosed in my applications hereinbefore referred to. Fig. 2 illustrates diagrammatically an embodiment of my invention and Figs. 3, 4 and 5 illustrate diagrammatically modifications of my invention.

My invention is illustrated in the accompanying drawings which show by way of example three methods of carrying it out. In all the figures, the protective means include one or more biasing transformers of the kind referred to above because this is our preferred arrangement but the invention can obviously be applied to protective means including balanced arm relays, reverse current relays or similar apparatus. For the sake of simplicity in the accompanying drawings, I have illustrated the application of my invention to one phase only of a circuit.

For the purpose of more clearly illustrating my present invention, there is shown in Fig. 1 a form of my biasing transformer which comprises a three legged core 10 preferably of laminated construction, provided with a primary or operating winding 11 and a secondary winding 12 mounted on the central leg. These two windings are inductively related and the flux set up by the primary winding 11 threads the secondary winding 12 and divides in the outer legs of the core which form the return paths. On the outer legs of the core, there is mounted in two parts a restraining winding 13. Magnetic flux set up by the restraining winding 13 circulates only in the outer portion of the core 10 because the two parts of this winding are wound so that their effects in the central leg mutually cancel. Thus restraining winding 13 is not inductively related to either of the windings 11 or 12. If a relatively heavy current is passed through winding 13, it saturates the outer legs of the core 10 and diminishes the inductive effect between windings 11 and 12. In other words, variation of the current strength in restraining winding 13 varies the inductive relation between windings 11 and 12 between maximum and minimum values.

Figure 3:
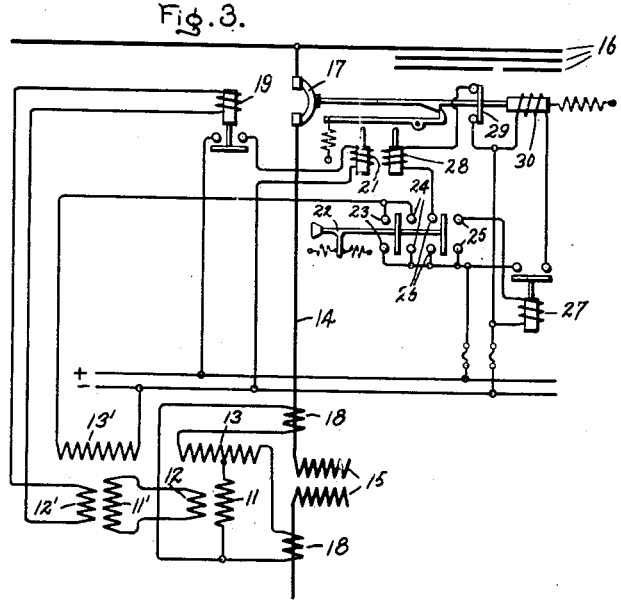

In Figs. 2 to 4 inclusive, for the sake of simplicity, I have adopted a conventional form for illustrating the biasing transformer which is that the restraining winding 13 is shown horizontal and the operating winding 11 is shown as the longer of the two vertical windings and the secondary winding 12 as the shorter of the two vertical windings.

Referring now to Fig. 2, the circuit 14 connects the windings of a power transformer 15 to one of the bus-bars 16, only one phase being shown. A circuit breaker 17 controls the circuit 14 and current transformers 18, 18, one on each side of the transformer 15 are connected in circuit to form a circulating current protective arrangement for the same. In the circulating current circuit there is a restraining winding 13, and between equi-potential points of the circuit is connected the operating winding 11 of a biasing transformer, on which both windings are assembled. The secondary winding 12 instead of being connected directly to a protective relay 19, is connected to the operating winding 11' of a second biasing transformer whose secondary winding 12' is connected to the protective relay 19 and which has an auxiliary or biasing winding 13' connected to a direct current source through an auxiliary switch 20. The auxiliary switch 20 has two pairs of fixed contacts, one pair of which is held open when the main switch 17 is in the full closed or full open position, but in the intermediate positions of the switch 17 that is during the movements of the main switch, both pairs of contacts are closed and the circuit of the biasing winding 13' is completed and the winding therefore energized. When the main switch 17 is fully closed, and accordingly when there is no current in winding 13', the protective apparatus works as an ordinary biased circulating current arrangement, that is to say, it is restrained on through overloads by the restraining winding 13.

In the event of a fault on the transformer 15, the difference current will excite operating winding 11 which, by a second transformation, will excite operating winding 11' and consequently relay 19 which energizes the trip coil 21 opening the switch 17 of the circuit 14.

When the circuit 14 is again switched in, if the fault on the transformer 15 should have cleared, the flux induced in the second or auxiliary biasing transformer core, due to the energization of the auxiliary winding 13' will saturate the core sufficiently to restrain or render less sensitive the inductive relation between the operating winding 11' and the secondary winding 12'. That is to say, a small operating current in the operating winding 11', arising upon surges or transient currents in the main circuit 14, owing to the highly saturated state of the second biasing transformer core, will not induce an electromotive force in the secondary winding 12' sufficient to operate the relay 19. But should the circuit 14 be switched in before the fault on the transformer 15 has cleared, the difference current flowing in the operating winding 11', due to the combination of the fault and surges, induces in the secondary winding 12' a current sufficient to operate relay 19 in spite of the restraining effect of the auxiliary winding 13'.

Fig. 3 shows a similar arrangement, but in which the switch 17 is operated through a remote control circuit. The protective circuit is arranged as in Fig. 2, but winding 13' is energized in an alternative way. It would of course be possible to energize winding 13' in the same way as in Fig. 2, but it is preferable to do it as shown in Fig. 3, because transient currents may take an appreciable number of cycles before being damped out. In the scheme shown in Fig. 3, the auxiliary winding 13' is energized during the period of operating a remote control switch 22. This period can last for a second or two if desirable. The remote control switch 22 has pairs of contacts 23, 24, 25 and 26. Contacts 23 and 24 control the energization of auxiliary winding 13', and contacts 25 and 26 control the operating means of the switch 17. As shown, 27 is a closing relay which is operated when switch 22 has its contacts 25 closed, and 28 is an opening coil which is energized when the control switch 22 has its contacts 26 closed. There is an auxiliary switch 29 on the switch 17 which opens the opening coil circuit when the switch is tripped, so that the control switch does not have to open the trip circuit on resetting. Obviously the switch 17 may also be provided with an auxiliary switch to open the circuit of the trip coil 21 so as to save the more delicate contacts of the relay 19. A solenoid or closing coil 30 which operates to close the switch 17 is controlled by closing relay 27 as the closing coil takes too much current to be broken on remote control switch 22. In order to close the switch 17, therefore, contacts 25 of the remote control switch 22 are closed, and in order to trip it, contacts 26 are closed. In either case, winding 13' is energized through either contacts 23 or 24 respectively.

In Figs. 2 and 3, there is shown a two-stage biasing transformer. With this arrangement there is no inductive effect in winding 13' due to any alternating currents. In a complete three-phase element, however, I might arrange the windings as shown in Fig. 4, where I have put the auxiliary winding 13' on the same biasing transformer as the overload restraining winding 13. Although the invention is shown in Figure 4 as applied to one phase only for the sake of clearness, its application to all three phases will present no difficulties to one skilled in the art. In this latter case, the three auxiliary windings will be arranged in series, and there will be no resultant inductive effect between the windings supplied with alternating current and the auxiliary winding unless there is an earth fault. In any case the auxiliary winding is normally open-circuited.

Fig. 5 is similar to Fig. 4, except that it shows the windings of the biasing transformer in position on the core thereof. The operating windings 11 are connected between the terminal 31 and the point 32 which is the mid point of the restraining winding 13. The auxiliary winding 13' is connected to the terminals 33, 34, the secondary winding 12 to the terminals 35, 36. The restraining winding 13 comprises four windings between the terminals 37, 38, the pair on each limb of the transformer being wound to assist one another and to produce a flux opposed to that produced by the other pair, said fluxes being indicated by the double headed arrows. By splitting up the restraining winding in this manner and tapping it at the point 32, I obtain the required points 31 and 32, normally at equal potential, between which the operating winding 11 is connected.

It should be noted that when using a single biasing transformer, as in Figs. 4 and 5, should the transformer be one in which an air-gap is required, a considerable increase in the number of turns of the auxiliary winding is essential in order that the magnetic circuit thereof may become saturated when necessary. This may not always be practicable. Consequently, although the arrangements indicated in Figs. 4 and 5 are economical in that a single biasing transformer only is used, yet I prefer the arrangements of Figs. 2 and 3. For then it is possible to obtain a strong restraining effect from the auxiliary winding 13' by using a transformer having no air-gap, and, at the same time, I am not restricted in this manner with respect to the other transformer having the windings 11, 12 and 13, in which an air-gap can be incorporated or not as the protective system may require.

Referring again to Fig. 2, an additional switch 39 may be connected in series with an adjustable resistance 40 as shown. This switch will be normally open. If, however, for any purpose, it is desired that the apparatus shall be rendered less sensitive, switch 39 may be closed and the resistance 40 adjusted to give the desired sensitivity. The auxiliary winding 13' is now constantly excited to a certain amount, depending upon the resistance 40, but during the operation of the auxiliary switch 20, this resistance will be short-circuited and consequently the apparatus will operate in the manner aforesaid. In like manner, I may apply this device to any of the other examples herein described.

The invention can be readily adapted to meet the needs of special cases and the above examples are only for the purposes of illustration. It can be applied to other forms of protective apparatus than that shown.

What I claim as new and desire to secure by Letters Patent of the United States, is:

1. The method of controlling the operation of a protective system of the class described wherein electro-responsive protective apparatus is arranged to control a line switch with a discriminating differential action, which comprises impressing an auxiliary electromotive force upon the protective apparatus during the closing and opening periods of said switch to render the responsiveness of the protective apparatus less sensitive during such periods.

2. In combination with an electric circuit, a switch adapted to be operated to control said circuit, electro-responsive means operative in response to abnormal conditions on said circuit to control said switch, and means for impressing an auxiliary electromotive force on said electroresponsive means during the opening and closing of said switch to render the responsiveness of said electroresponsive means less sensitive whereby to prevent operation of said switch by said electroresponsive means upon transient currents during switch closing and switch opening.

3. In combination with an electric circuit, a switch adapted to be operated to control said circuit, electroresponsive means operative in response to abnormal conditions on said circuit to control said switch, means associated with said switch adapted during the opening or closing thereof to render the responsiveness of said electroresponsive means less sensitive whereby to prevent operation of said switch by said electroresponsive means upon transient currents during switch opening or switch closing, and means adapted to be operated independently of said switch to vary the responsiveness of said electroresponsive means.

4. In combination with an electric current, a switch adapted to be operated to control said circuit, electroresponsive means operative in response to abnormal conditions on said circuit to control said switch comprising a biasing transformer having a primary winding connected in circuit to receive current proportional to the difference in the currents between two points in said circuit upon the occurrence of a fault between said points and a secondary winding inductively associated with said primary winding effective to control the operation of said switch, and means for impressing an auxiliary electromotive force upon said transformer to decrease the effectiveness of said secondary winding during switch opening and switch closing.

5. In combination with an electric circuit, a switch adapted to be operated to control said circuit, electroresponsive means operative in response to abnormal conditions on said circuit to control said switch comprising a restraining winding arranged to be energized in accordance with the current in said circuit and an operating winding arranged to be energized in response to an abnormal condition on the circuit, and means for impressing an auxiliary electromotive force on said electroresponsive means during the opening and closing of said switch to render the responsiveness of said electroresponsive means less sensitive whereby to prevent operation of said switch by said electroresponsive means upon transient currents during switch opening and closing.

6. In combination with an electric circuit, a switch adapted to be operated to control said circuit, electroresponsive means operative in response to abnormal conditions on said circuit to control said switch comprising a biasing transformer having a winding connected in circuit to receive current proportional to the difference in the currents between two points in said circuit upon the occurrence of a fault between said points, a secondary winding inductively associated with said primary winding effective to control the operation of said switch and a restraining winding non-inductively associated with said primary and secondary windings, and means associated with said switch operative during the opening and closing thereof to control the energization of said restraining winding thereby to decrease the effectiveness of said secondary winding during switch opening and closing.

7. In combination with an electric circuit, a switch adapted to be operated to control said circuit, electroresponsive means operative in response to abnormal conditions on said circuit to control said switch comprising a biasing transformer having a winding connected in circuit to receive current proportional to the difference in the currents between two points in said circuit upon the occurrence of a fault between said points, a secondary winding inductively associated with said primary winding effective to control the operation of said switch and a restraining winding non-inductively associated with said primary and secondary windings, means associated with said switch operative during the opening and closing thereof to control the energization of said restraining winding thereby to decrease the effectiveness of said secondary winding during switch opening and closing, and means adapted to be operated to vary the energization of said restraining winding whereby to control the energization of said secondary winding.

8. In combination with an electric circuit, a switch adapted to be operated to control said circuit, current transformers associated with said circuit at each of two points thereof and having their secondaries connected in series, a biasing transformer comprising a restraining winding in series relation with the secondaries of said current transformers, an operating winding connected across normally equipotential points of the circuit of the secondaries of said current transformers and a secondary winding, an auxiliary biasing transformer comprising an operating winding in circuit with the secondary winding of said biasing transformer, a secondary winding, and a restraining winding, a relay arranged to control said switch and having an energizing winding in circuit with the secondary winding of said auxiliary biasing transformer, and means operative during the closing and opening of said switch to control the energization of the restraining winding of said auxiliary biasing transformer whereby to prevent said relay from operating to control said switch upon transient conditions accompanying switching operations.

In witness whereof, I have hereunto set my hand this 17th day of August, 1923.

ALAN STEWART FITZ GERALD.